United States Patent [19]

Sinha et al.

[11] 4,215,096

[45] Jul. 29, 1980

[54] REMOVAL OF ACIDIC CONTAMINANTS FROM GAS STREAMS BY CAUSTIC IMPREGNATED ACTIVATED CARBON

[75] Inventors: Rabindra K. Sinha, Coraopolis; Charles K. Polinsky, Pittsburgh; S. David Cifrulak, Oakdale; Norman J. Wagner, Pittsburgh, all of Pa.

[73] Assignee: Calgon Corporation, Pittsburgh, Pa.

[21] Appl. No.: 959,137

[22] Filed: Nov. 9, 1978

[51] Int. Cl.² ............................................. B01D 53/34
[52] U.S. Cl. ................................... 423/241; 423/239; 423/240; 423/244; 423/245
[58] Field of Search ............... 423/210 S, 230, 240 S, 423/241, 473, 488, 499, 244 A, 239, 245 S; 55/71, 74, 73; 252/192, 447

[56] References Cited

U.S. PATENT DOCUMENTS

| | | | |
|---|---|---|---|
| 1,781,664 | 11/1930 | Rockwell | 252/447 X |
| 1,843,355 | 2/1932 | Behrman | 423/499 |
| 2,196,246 | 4/1940 | Brown et al. | 423/488 |
| 2,537,448 | 1/1951 | Engel | 423/240 S |
| 4,072,479 | 2/1978 | Sinha et al. | 55/74 X |
| 4,072,480 | 2/1978 | Wagner | 55/74 X |
| 4,113,839 | 9/1978 | Maki et al. | 252/447 X |

*Primary Examiner*—Earl C. Thomas
*Attorney, Agent, or Firm*—Mario A. Monaco; Martin L. Katz; Edmunde D. Riedl

[57] ABSTRACT

Gas streams contaminated with acid and acid precursor gases and vapors are purified by contacting the gas streams with activated carbon impregnated with sodium hydroxide.

2 Claims, No Drawings

REMOVAL OF ACIDIC CONTAMINANTS FROM GAS STREAMS BY CAUSTIC IMPREGNATED ACTIVATED CARBON

BACKGROUND OF THE INVENTION

This invention is concerned with a method for the removal of acid and acid percursor gases and vapors from the gases, by passing the polluted gas through a bed of activated carbon impregnated with caustic.

The acid and acid precursor gases and vapors, the removal of which is accomplished by the novel method of this invention are: halogens, such as bromine, iodine and fluorine, especially chlorine; the corresponding hydrogen halides, especially hydrogen chloride; sulfur oxides (SOx), especially sulfur dioxide and trioxide; nitrogen oxides (NOx), especially nitrogen di- and trioxide; low molecular weight organic acid vapors such as formic and acetic acids; and esters of organic acids such as ethyl and amyl acetate.

An impregnated activated carbon suitable for use in the novel method of this invention is an activated carbon impregnated with about 0.5 to about 20% by weight of sodium hydroxide and from about 4 to about 50% by weight of moisture, both based on weight of dry activated carbon. Carbons of this type are fully described in U.S. Pat. No. 4,072,479, the disclosure of which is incorporated herein by reference.

The novel method of this invention has several applications such as providing non-corrosive make-up air for electronic equipment in control rooms, particularly in water treatment plants where the air may have up to a few parts per million of chlorine, and in industrial chemical plants which can provide a great variety of contaminant gases and vapor with corrosive, acidic properties. Another application is treatment of flue gases for removal of acidic components therefrom.

Traditionally, such gas purification needs have been supplied by various methods, such as scrubbing, adsorption and absorption. Now with the present invention there is provided a novel method combining all of the advantages associated with adsorption with enhanced capacities over conventional adsorbents combined with some of the advantages of a scrubbing system.

SUMMARY OF THE INVENTION

In accordance with the present invention, the caustic impregnated activated carbon is employed for removal of acid and acid percursor gases and vapors from gas streams. When the activated carbon has become spent, or loaded, as a result of adsorption of the acid reacting substance, it is then regenerated with caustic in the manner described in U.S. Pat. No. 4,072,479 previously cited.

The concentration of the acid and acid precursor gases and vapors in the gas stream is not critical and concentrations resulting in as low an amount as $1.0 \times 10^{-6}$ mole of the materials passing through the activated carbon per minute can be removed. The relative effectiveness of caustic impregnated activated carbons in removing the acid and acid precursor gases and vapors is measured by contacting gas streams with known contaminants with the caustic impregnated activated carbon for known periods of time from which can be determined the loading of the carbon as a weight percent of dry activated carbon.

The amount of acid and acid precursor gas or vapor adsorbed by any particular activated carbon will be a function of at least the following factors: the degree of attraction of the impregnated activated carbon for the particular acid reacting compound; the pore structure of the impregnated activated carbon, particularly with respect to size; the specific surface area of the impregnated activated carbon; the relative humidity of the gas stream; and the surface characteristics of the impregnated activated carbon. It is preferred to employ an activated carbon with a large proportion of its pores having diameters below 80 A. It is particularly important to employ impregnated activated carbons having high surface areas. Granular activated carbon is preferred to powder, and the size range of the granules is largely a matter of choice, although granules falling between Nos. 4 and 10 of the U.S. Sieve Series are preferred. Thus, it is preferred to use IVP granular activated carbon manufactured by the activated carbon division of Calgon Corporation, Pittsburgh, Pennsylvania.

The presence of water vapor during the adsorption of the acid reacting materials increases the efficiency permitting heavier loading of the impregnated activated carbon. For example, 80% relative humidity increases the loading capacity by a factor of 3-4 times over that obtainable at 0% relative humidity.

The removal of chlorine, one of the acid precursors for which the novel method of this invention is useful, by activated carbon is a chemisorption rather than a simple adsorption and may be represented as follows:

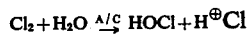

wherein A/C represents activated carbon and the C(O) is bound to the carbon surface.

Employing the caustic impregnated activated carbon in the novel method of this invention there is provided the additional chemical reactions represented as:

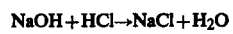

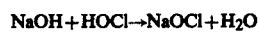

which serves to aid in the removal of any acidic materials that were originally present in the environment, or produced by reactions of halogens with the activated carbon. Accordingly, in some applications, particularly wherein the principle contaminant to be removed is chlorine or one of the other halogens it is appropriate to use a series of at least two beds of activated carbon in tandem, wherein the activated carbon of the first bed on the upstream side is not impregnated with caustic but is otherwise of the same type, such as BPL granular activated carbon, also manufactured by Calgon Corporation and one or more of the downstream beds comprises the caustic impregnated activated carbon. With this system, the halogen gas contaminant is converted to acidic contaminants by the first bed of activated carbon, which are subsequently adsorbed on the caustic impregnated activated carbon in accordance with the novel method of this invention.

The following experiments will serve to better illustrate this novel method.

The apparatus comprises (a) a compressed gas cylinder fitted with appropriate outlet control valves containing nitrogen with 520 parts per million of chlorine connected to (b) a small mixing chamber, with an inlet port for introducing metered amounts of other components such as water vapor, connected to (c) a tube or cylinder (1.84 cm. diameter by 15.25 cm. length) for holding the activated carbon fitted with a gas inlet and outlet for downward flow, connected to (d) a flow meter, the outlet tube from which is fitted with outlet sample ports for measuring such factors as humidity and the presence of other constituents in the gas stream.

EXPERIMENT 1—BPL-Carbon, 80% RH Exit

A gas stream consisting of nitrogen containing 520 ppm of chlorine was passed through 10 g. of BPL carbon previously equilibrated with 80% relative humidity air, at a flow rate of 1.2 liters/minute which corresponds to a contact time of 1 second. Water was added to the inlet stream at the rate of 1.5 ml./hour to produce a relative humidity of 80%. Gas flow was terminated after 790 minutes with no sign of chlorine breakthrough. The amount of chlorine adsorbed by 10.0 g. of carbon corresponds to a wieght percent loading of 15.6. Other experiments following substantially the procedure of Experiment 1 were conducted with the conditions and results depicted in Table I.

TABLE I

| Experiment | Carbon | RH Inlet | RH[2] Carbon Moisture | RH Exit | Gas Flow Time (Min.) | Wt. % Loading | |
|---|---|---|---|---|---|---|---|
| | | | | | | $Cl_2$ | Cl |
| 2 | BPL | 80.0% | 2.0% | — | 315 | 6.21 | 0.00 |
| 3 | BPL | 0.0% | 2.0% | — | 395 | 7.80 | 0.00 |
| 4 | IVP | 0.0% | 4.2% | — | 134 | 2.63 | 2.63 |
| 5 | IVP | 80.0% | 4.2% | 68%[1] | 480 | 9.50 | 9.50 |

NOTE: Wt. % loading is not a measure of maximum loading but rather represents the amount of chlorine and chloride adsorbed during the arbitrary time of gas flow. Breakthrough of chlorine occurred only in Experiment 4 at 134 minutes. After 450 minutes, the effluent concentration of chloride was 26% of influent concentration.
[1] during middle of the run.
[2] In Experiments 2-5, the activated carbon was "dry" and not pretreated with water vapor as described in Experiment 1.

What is claimed is:
1. A process for the removal of chlorine from gas streams which comprises contacting the gas stream with activated carbon impregnated with about 0.5 to about 20 percent by weight sodium hydroxide and about 4 to about 50 percent by weight of moisture.
2. A process as in claim 1 wherein the gas stream is first contacted with an activated carbon that is not impregnated with sodium hydroxide.

* * * * *